US010484281B1

United States Patent
Mucci et al.

(10) Patent No.: US 10,484,281 B1
(45) Date of Patent: Nov. 19, 2019

(54) ROUTER OPERATING METHODS AND APPARATUS USING VIRTUAL VPN INSTANCES FOR HOSTS OF REMOTE EXTRANET VPNS

(71) Applicant: Cisco Technology, Inc., San Jose, CA (US)

(72) Inventors: Brent P. Mucci, Ontario (CA); Marc Portoles Comeras, Mountian View, CA (US); Vrushali Ashtaputre, San Jose, CA (US); Victor M. Moreno, Carlsbad, CA (US); Hatem Mohammad R.A. Abouzeid, Ontario (CA)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 16/017,554

(22) Filed: Jun. 25, 2018

(51) Int. Cl.
| H04L 12/741 | (2013.01) |
| H04L 12/747 | (2013.01) |
| H04L 29/06 | (2006.01) |
| H04L 12/715 | (2013.01) |
| H04L 12/761 | (2013.01) |
| H04L 12/751 | (2013.01) |

(52) U.S. Cl.
CPC ............ H04L 45/745 (2013.01); H04L 45/02 (2013.01); H04L 45/16 (2013.01); H04L 45/64 (2013.01); H04L 45/742 (2013.01); H04L 63/0272 (2013.01)

(58) Field of Classification Search
CPC ....... H04L 45/745; H04L 45/02; H04L 45/16; H04L 63/0272; H04L 45/742; H04L 45/64
See application file for complete search history.

(56) References Cited

U.S. PATENT DOCUMENTS

| 2006/0215578 | A1 | 9/2006 | Andrapalliyal et al. |
| 2008/0040793 | A1* | 2/2008 | Nilsen ................. H04L 63/0209 726/15 |
| 2008/0232384 | A1* | 9/2008 | Miyabe ............... H04L 12/2856 370/401 |
| 2015/0341188 | A1* | 11/2015 | Fichou ................ H04L 12/4675 370/252 |
| 2016/0173405 | A1 | 6/2016 | Freitas et al. |
| 2017/0026417 | A1 | 1/2017 | Ermagan et al. |
| 2018/0069797 | A1 | 3/2018 | Williams et al. |
| 2019/0028381 | A1* | 1/2019 | Li .......................... H04L 29/06 |

* cited by examiner

Primary Examiner — Mohamed A Kamara
(74) Attorney, Agent, or Firm — Merchant & Gould P.C.

(57) ABSTRACT

In one illustrative example, a router may be configured to provide a plurality of virtual private network (VPN) instances for a plurality of VPNs associated with a plurality of IDs. Each VPN instance may comprise a forwarding table instance for storing a plurality of host-to-router mappings for the VPN. The router may be further configured to provide a virtual VPN instance for a virtual VPN associated with an ID of a remote extranet VPN. The virtual VPN instance may comprise a map-cache for storing a host-to-router mapping for the remote extranet VPN. The virtual VPN instance has no corresponding forwarding table instance for user plane traffic associated with the remote extranet VPN, but rather serves as part of a control plane interface for control signaling associated with the remote extranet VPN. Accordingly, the router may provide multiple updates to host-to-router mappings in forwarding table instances of the VPNs in accordance with a change in the host-to-router mapping in the virtual VPN instance.

20 Claims, 10 Drawing Sheets

ROUTER OPERATING METHODS AND
APPARATUS USING VIRTUAL VPN
INSTANCES FOR HOSTS OF REMOTE
EXTRANET VPNS

TECHNICAL FIELD

The present disclosure relates generally to methods and apparatus for use in providing virtual private networks (VPNs) for hosts in communication networks, and more particularly to router operating methods and apparatus for providing VPNs with use of "virtual VPN instances" for hosts of remote extranet VPNs.

BACKGROUND

A network overlay may employ software virtualization to create an additional layer of network abstraction on top of a physical network. Such a network overlay may be used to provide virtual private networking (VPN) for hosts in the network.

Specifically, network routers may be configured to operate using a network overlay protocol to facilitate VPN networking. The protocol may be, for example, Locator ID/Separation Protocol (LISP); however, other suitable alternatives may be utilized, such as Virtual Extensible LAN (VXLAN), Enhanced VLAN (EVLAN), or Identifier Locator Addressing (ILA). Here, the routers create and maintain multiple VPN instances comprising forwarding tables for the routing of user plane traffic associated with different VPNs.

Current implementations of these routers involve remote extranet VPNs to be instantiated locally, so that control plane messages received in the context of these VPNs may be processed. However, when routers support one-to-many extranet VPN deployments, the amount of control plane signaling associated with the extranet VPNs grows in proportion to the number of extranets. At scale, the amount of such control plane signaling may become very large or even prohibitive.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

OVERVIEW

In one illustrative example, a router may be configured to provide a plurality of virtual private network (VPN) instances for a plurality of VPNs associated with a plurality of IDs. Each VPN instance may comprise a forwarding table instance for storing a plurality of host-to-router mappings for the VPN. The router may be further configured to provide a virtual VPN instance for a virtual VPN associated with an ID of a remote extranet VPN. The virtual VPN instance may comprise a cache or map-cache for storing a host-to-router mapping for the remote extranet VPN. The virtual VPN instance may have no corresponding forwarding table instance in the router, but simply serve as part of a control plane interface for control signaling associated with the remote extranet VPN (e.g. no user plane traffic associated with the remote extranet VPN is or need be facilitated by the router). Accordingly, the router may provide multiple updates to host-to-router mappings in forwarding table instances of the VPNs in response to a change in the host-to-router mapping of the virtual VPN instance. Such a virtual VPN instance may be provided in association with each one of a plurality of different remote extranet VPNs.

More detailed and alternative techniques and implementations are provided as described further below.

EXAMPLE EMBODIMENTS

As described in the background, a network overlay may employ software virtualization to create an additional layer of network abstraction on top of a physical network. Such a network overlay may be used to provide virtual private networking (VPN) for hosts in a network. Specifically, routers in the network may be configured to operate using a network overlay protocol to facilitate VPN networking. The protocol may be, for example, Locator ID/Separation Protocol (LISP); however, other suitable alternatives may be utilized, such as Virtual Extensible LAN (VXLAN), Enhanced VLAN (EVLAN), or Identifier Locator Addressing (ILA). Here, the routers create and maintain multiple VPN instances comprising forwarding tables for the routing of user plane traffic associated with different VPNs.

The technology utilized may be based on or referred to as virtual routing and forwarding (VRF) technology. Such network virtualization creates multiple, logically-separated topologies across one common physical infrastructure. Network reachability within a VPN is typically restricted to the addresses of the end-points that are members of the VPN. Such a level of segmentation is useful in providing fault isolation, enforcing access-control restrictions, enabling the use of a single network by multiple tenants, and scoping network policy per VPN.

Again, a protocol referred to as LISP may be to used create and maintain VPNs. LISP provides two namespaces: an End-point Identifier (EID) namespace and a Routing Locator (RLOC) namespace. A host (e.g. a computer or a server) may be associated with an EID (e.g. an IP address), whereas a router may be associated with an RLOC (e.g. an IP address). A router may be an ingress tunnel router (ITR), an egress tunnel router (ETR), or a combination thereof (ITR+ETR=XTR).

A LISP Mapping System (e.g. including a mapping server and/or database) maps EIDs to RLOCs. Either the EID space, the RLOC space, or both, may be segmented. The LISP Mapping System can be used to map a segmented EID address space to the RLOC space. When the EID namespace is segmented, a LISP Instance-ID (IID) is encoded in both the data plane and the control plane to provide segmentation as well as to disambiguate overlapping EID Prefixes. This allows multiple VRFs to share a common routing locator network while maintaining EID prefix segmentation.

In a LISP VPN, XTRs that are members of the VPN should be configured with a forwarding context (e.g. a VRF) and the associated IID for the VPN. Based on this configuration, the ETRs must register the EIDs within the forwarding context as Extended EIDs (IID+EID). The LISP mapping system consolidates the registrations from all the ETRs in the VPN and builds a mapping database for the VPN. ITRs that are members of the VPN will do forwarding lookups in the forwarding context where traffic was received. Upon a cache miss within the forwarding context, the ITR will issue a Map-Request for the destination EID and include the VPN's IID. This information will be encoded as an Extended EID (IID+EID) in the Map-Request issued. The IID to associate with the EID in this Map-request is derived from the configuration of the VPN's forwarding context (in which the traffic was received). The Mapping System should reply to the Map Request with a Mapping for the Extended EID (IID+EID), the IID of the Extended EID should be used to identify the forwarding context in which the Mapping received should be cached.

Once a mapping has been cached in the VPN's forwarding context, the ITR will encapsulate the traffic towards the RLOC in the mapping. The IID corresponding to the VPN's forwarding context must be included in the IID field of the data plane header. When the encapsulated traffic is received at the ETR, the encapsulation header is removed and the IID received in the header is used to identify the forwarding context to use to do a forwarding lookup for the decapsulated traffic.

Additional details regarding LISP VPN networking may be found in, for example, a document titled "LISP Virtual Private Networks (VPNs)," draft-moreno-lisp-vpn-00, an Internet-Draft from the Network Working Group.

Distributed extranet VPN support may also be provided with LISP. As the extranets are not centralized but rather distributed to ITRs, there is no centralized point of failure. For LISP extranet routes, an ITR may operate to encapsulate user plane traffic associated with the IID corresponding to the VPN connected to the ETR. Extranet routes may be installed at the ITR with the IID corresponding to the destination VPN.

Such routers as described need to replicate control signaling for each and every VPN to which a route is leaked. When a host of a remote extranet VPN moves from one router to another router, for example, each and every VPN instance in the router may need to have the same extranet route updated separately and individually. At scale, when the number of VPNs grows, the amount of control signaling may become very large or even prohibitive.

The forwarding tables in the routers are comprised of costly, high-speed memory, such as ternary content-addressable memory (TCAM). Conservation of such costly memory space is desirable. Extranets may be built on the observation that, when deploying network overlays, not all routers need to instantiate all VPNs with their associated routes in the forwarding tables. Extranet "hard state" in the forwarding tables may be programmed on a need-to-know basis.

Accordingly, what is proposed is the creation and maintenance of "virtual VPNs instances" (or "virtual soft states") to facilitate "virtual VPNs" for remote extranet VPNs. Virtual VPNs may be fully functional from a control signaling perspective, but do not lead to the generation of "hard states" in the router. Thus, the advantages associated with a distributed hard state for extranets may be maintained without "paying the price" of an increased control signaling load.

A "virtual VPN instance" in the router may be used to exchange control plane signaling associated with a remote extranet VPN. Advantageously, the router need not replicate control signaling to each and every VPN to which an extranet route is leaked. When a host of a remote extranet VPN moves from one router to another, for example, a single exchange of control signaling may trigger an update to each and every affected VPN instance in the router. Refresh signaling may be performed only once, and this may correctly refresh the hard state on each and every VPN that has learned the extranet route. No control signaling across VPN boundaries in the router is necessary. Further, memory space in costly, high-speed memory of router forwarding tables may be conserved.

Figure 1A:
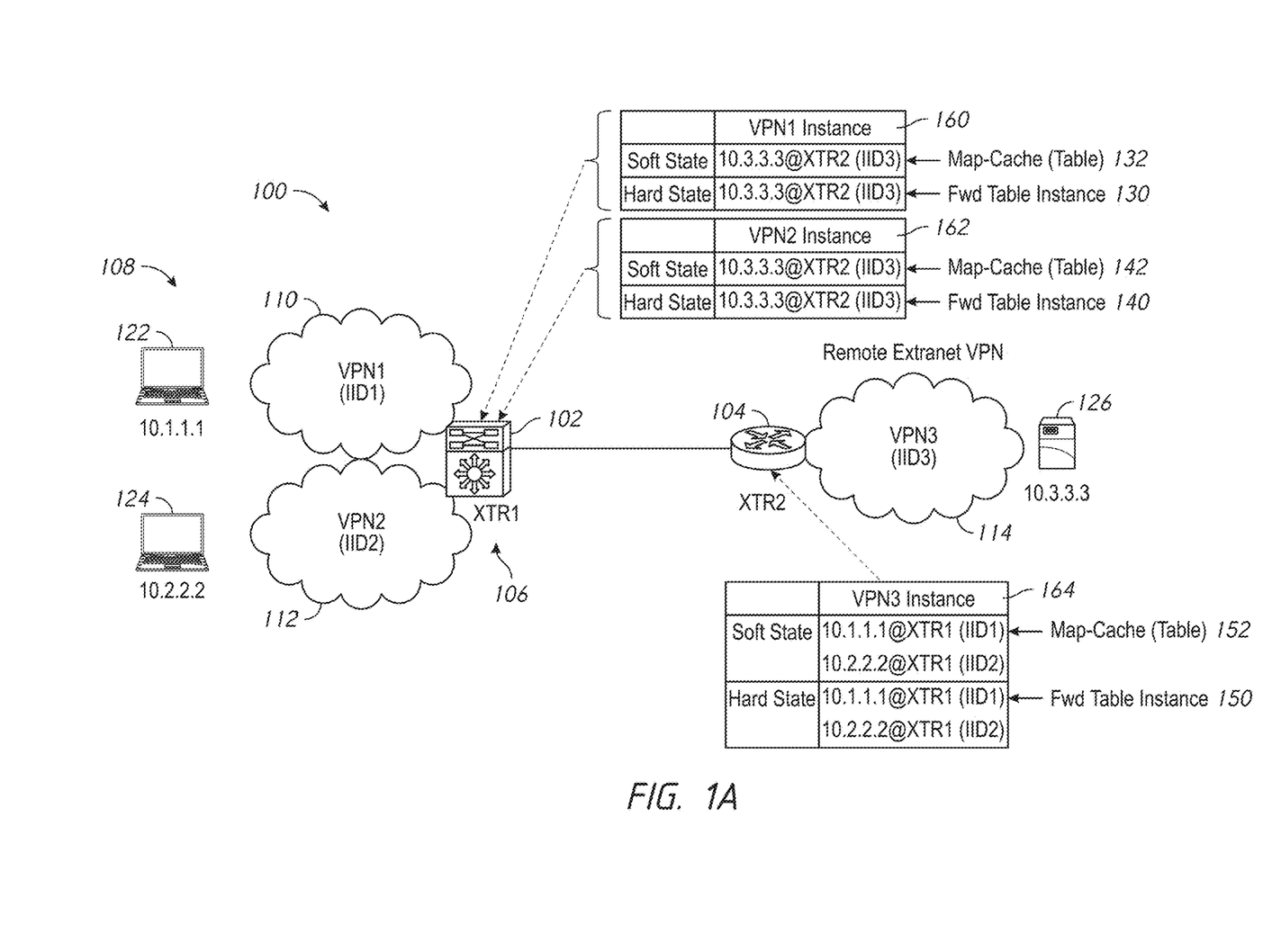
FIG. 1A is an illustrative representation of a network infrastructure arrangement for use in describing general virtual private networking (VPN) techniques which include the use of one or more remote extranet VPNs.

FIG. 1A is an illustrative representation of a network infrastructure arrangement 100 for use in describing general VPN techniques. Although LISP is used in the examples, any suitable network overlay protocol for VPN networking may be utilized (e.g. VXLAN, EVLAN, or ILA).

Network infrastructure arrangement 100 includes a plurality of routers 106 (e.g. a router 102 indicated as "XTR1," and a router 104 indicated as "XTR2") and a plurality of hosts 108 (e.g. hosts 122, 124, and 126). In FIG. 1A, host 122 (e.g. a computer or other computing device) may be identified with an End-point Identifier (EID) (e.g. an IP address) of 10.1.1.1; host 124 (e.g. a computer or other computing device) may be identified with an EID of 10.2.2.2; and host 126 (e.g. a server) may be identified with an EID of 10.3.3.3. Router 102 ("XTR1") may be identified with a Routing Locator (RLOC) (e.g. an IP address), generally indicated as "XTR1," and router 104 ("XTR2") may be associated with an RLOC, generally indicated as "XTR2."

Routers 106 may be configured to provide VPNs for the plurality of hosts 108 with use of VRF technology. In the example of FIG. 1A, host 122 may be associated with a VPN 110 ("VPN1"), host 124 may be associated with a VPN 112 ("VPN2"), and host 126 may be associated with a VPN 114 ("VPN3").

To provide VPNs in the network infrastructure arrangement 100, a router may be generally configured to create and maintain a plurality of VPN instances. Each VPN and/or VPN instance may be associated and/or identified with a unique ID, which may be an Instance-ID (IID). In general, a VPN instance comprises a forwarding table (or forwarding table instance) which includes a plurality of host-to-router mappings of the VPN. The host-to-router mappings in the forwarding table instance of the VPN are used for routing user data traffic between hosts of the VPN. Typically, a forwarding table is or includes a relatively costly, high-speed memory, such as TCAM. Each host-to-router mapping may be, for example, between an EID (e.g. an IP address) of a host and an RLOC (e.g. an IP address) of a router (e.g. an EID-to-RLOC mapping). Note that a VPN instance or forwarding table instance may refer or be referred to as a VRF, VRF instance, a forwarding context, or the like.

More specifically in FIG. 1A, router 102 ("XTR1") may be configured to create and maintain VPN instance 160 and VPN instance 162 to provide VPN 110 ("VPN1") and VPN 112 ("VPN2"), respectively. VPN instance 160 for VPN 110 ("VPN1") associated with IID1 may include a forwarding table instance 130 and an associated map-cache 132, and VPN instance 162 for VPN 112 ("VPN2") associated with IID2 may include a forwarding table instance 140 and an associated map-cache 142. On the other hand, router 104 ("XTR2") may be configured to create and provide a VPN instance 164 for VPN 114 ("VPN3") associated with IID3, which includes a forwarding table instance 150 and an associated map-cache 152. From the perspective of router 102 ("XTR1"), VPN 114 is a remote extranet VPN having no local member hosts/endpoints.

In general, a forwarding table instance of a VPN corresponds to storage of a "hard state" and its associated map-cache corresponds to storage of a "soft state." In router 102, a host-to-router mapping in VPN instance 160 for host 126 (e.g. 10.3.3.3 @XTR2 in the IID3 context) is stored in map-cache 132 as the "soft state," and this mapping may be (subsequently) stored in forwarding table instance 130 as the "hard state." Also in router 102, the same host-to-router mapping in VPN instance 162 for host 126 (e.g. 10.3.3.3@XTR2 in the IID3 context) is stored for VPN 112 in map-cache 142 as the "soft state," and this mapping may be (subsequently) stored in forwarding table instance 140 as the "hard state." In router 104, a host-to-router mapping in VPN instance 164 for host 122 (e.g. 10.1.1.1 @XTR1 in the IID1 context) is stored in map-cache 152 as the "soft state," and this mapping may be (subsequently) stored in forwarding table instance 150 as the "hard state." Also in router 104, a host-to-router mapping in VPN instance 164 for host 124 (e.g. 10.2.2.2@XTR1 in the IID2 context) is stored in map-cache 152 as the "soft state," and this mapping may be (subsequently) stored in forwarding table instance 150 as the "hard state."

Sometime during network usage, host 126 may be moved to a different location and/or become connected to a different router. In response, the host-to-router mapping for host 126 will change. That is, the router and/or RLOC in the host-to-router mapping will change. As a result, host-to-router mappings in other routers/VPNs (e.g. in router 102) may need to be updated.

Figure 1B:
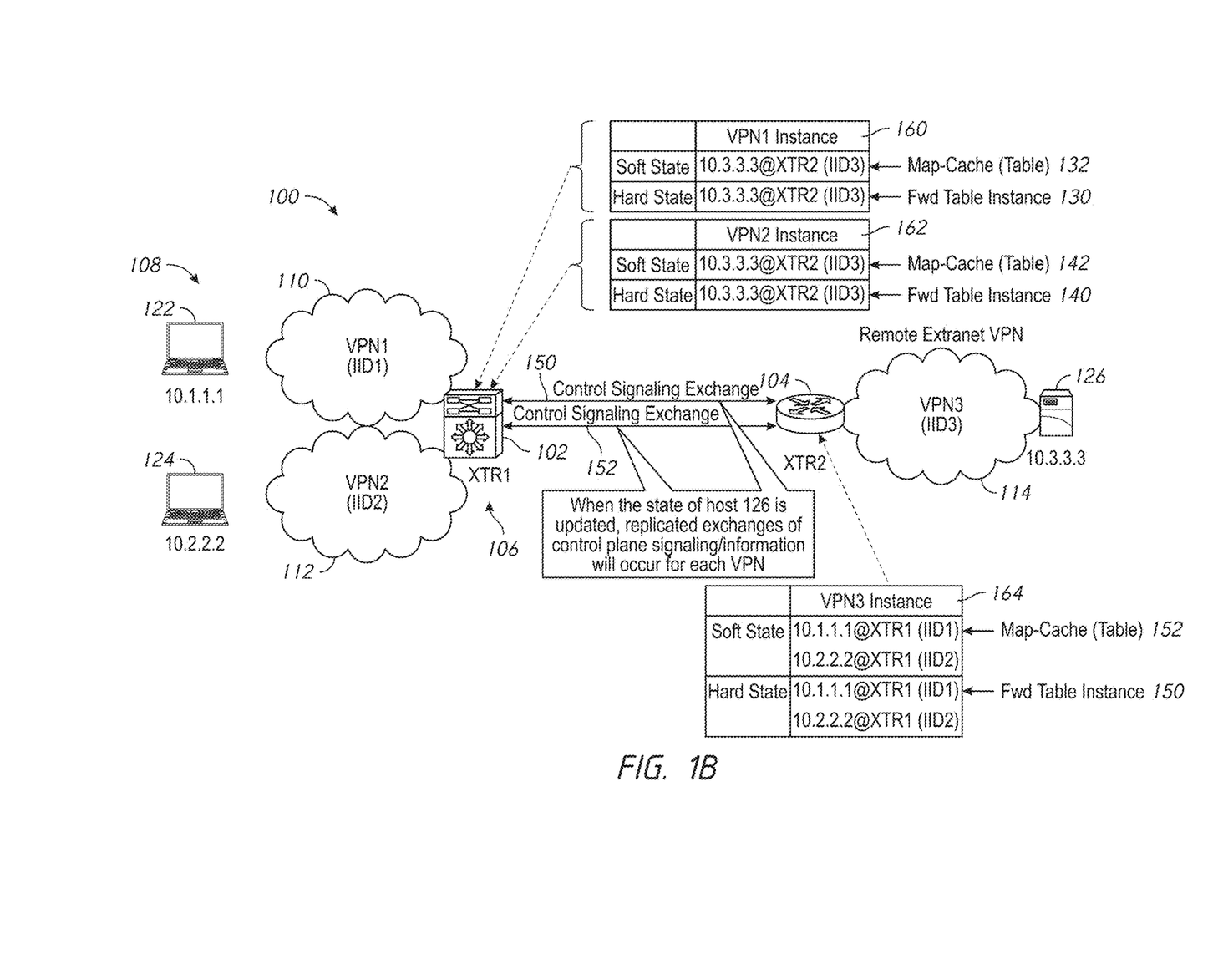
FIG. 1B is an illustrative representation of the network infrastructure arrangement of FIG. 1A, further illustrating multiple, replicated exchanges of control signaling/information used for updates when the state of a host in the remote extranet VPN is updated.

Thus, as indicated in FIG. 1B, an exchange of control plane signaling 150 between routers may need to take place to update the host-to-router mapping for host 126 in VPN instance 160 for VPN 110 ("VPN1"). Further as indicated in FIG. 1B, an additional (duplicate) exchange of control plane signaling 152 between routers may need to take place to update the host-to-router mapping for host 126 in VPN instance 162 for VPN 112 ("VPN2").

As is apparent, replicated control information is exchanged between routers when an update to a host-to-router mapping is needed. When the number of remote extranet VPNs becomes large, the number of exchanges of control plane signaling may become very large or even prohibitive.

Figure 2A:
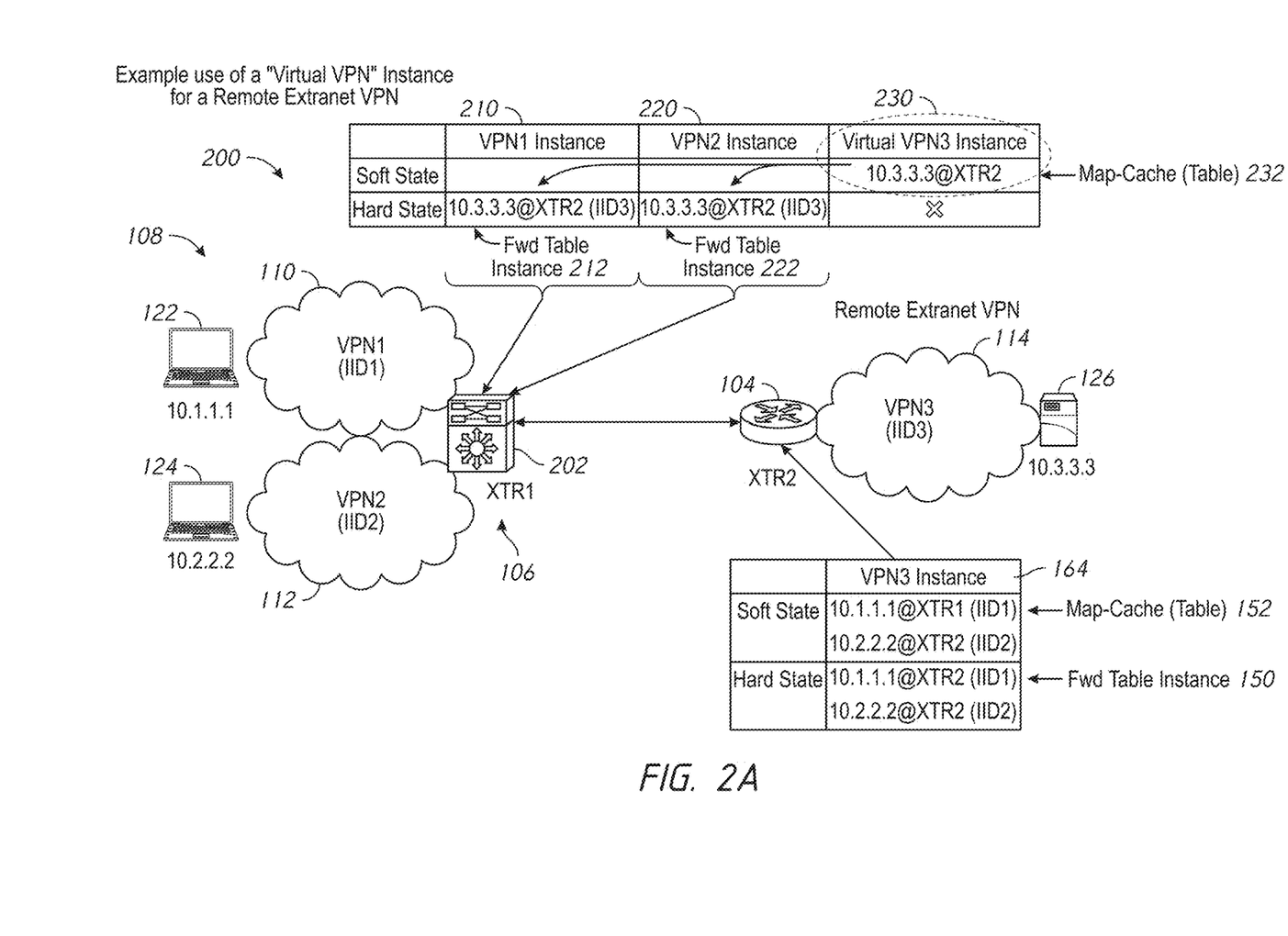
FIG. 2A is an illustrative representation of a network infrastructure arrangement for use in describing VPN techniques according to some implementations of the present disclosure, where a "virtual VPN instance" associated with a remote extranet VPN is provided.

FIG. 2A is an illustrative representation of a network infrastructure arrangement 200 for use in describing virtual private networking techniques according to some implementations of the present disclosure. Network infrastructure arrangement 200 includes the same or similar network elements and functionality as described above in relation to FIGS. 1A-1B, except that router 102 (now a "router 202" in FIGS. 2A-2B) is configured to employ VPN instances as well as "virtual VPN instances" for "virtual VPNs" according to some implementations of the present disclosure. To simplify the description and for comparative purposes, router 104 is configured to operate in the same or similar manner as that described in relation to FIGS. 1A-1B. Although LISP is used in the example implementations described herein, any suitable network overlay protocol may be utilized (e.g. VXLAN, EVLAN, or ILA).

In the example of FIG. 2A, router 202 ("XTR1") may be configured to create and maintain VPN instances 210 and 220 to provide VPNs 110 and 112, respectively. VPN instance 210 for VPN 110 ("VPN1") associated with IID1 comprises a forwarding table instance 212, and VPN instance 220 for VPN 112 ("VPN2") associated with IID2 comprises a forwarding table instance 222. The host-to-router mapping in VPN instance 210 of VPN 110 for host 126 (e.g. 10.3.3.3@XTR2 in the IID3 context) is stored in forwarding table instance 212 as the "hard state." The same host-to-router mapping in VPN instance 220 of VPN 112 for host 126 (e.g. 10.3.3.3 @XTR2 in the IID3 context) is stored in forwarding table instance 222 as the "hard state."

Router 202 may be further configured to create and maintain a virtual VPN instance 230 for a virtual VPN for host 126 of VPN 114 ("VPN3"), which is a remote extranet VPN. Virtual VPN instance 230 may comprise a cache or map-cache 232 for storing a host-to-router mapping of the remote extranet VPN 114 ("VPN3"). Virtual VPN instance 230 for the virtual VPN is without a (uniquely) corresponding forwarding table instance in router 202. Thus, virtual VPN instance 230 does not require the use of the relatively costly, high-speed memory in router 230. As is apparent, a VPN instance for VPN 114 is not instantiated in router 202, but rather virtual VPN instance 230 for a virtual VPN" associated with VPN 114 is created and maintained. Note that, with use of a virtual VPN instance, a specific map-cache or soft state need not be used or maintained in relation to either one of VPN instances 210 and 220.

Virtual VPN instance 230 of the virtual VPN may serve as part of a control plane interface for control signaling associated with the remote extranet VPN (i.e. VPN 114 or "VPN3"). For example, virtual VPN instance 230 may be used in an exchange of control signaling/information for an update to the host-to-router mapping of host 126 of the remote extranet VPN. For providing such an update(s), one or more pointers or links may be provided in association with the host-to-router mapping in map-cache 232 of virtual VPN instance 230.

For example, a first pointer or link may be provided for pointing or linking to forwarding table instance 212 of VPN instance 210, and a second pointer or link may be provided for pointing or linking to forwarding table instance 222 of VPN instance 220. In response to an update to the host-to-router mapping in map-cache 232 of virtual VPN instance 230, the first pointer or link may be used to identify and update the host-to-router mapping in forwarding table instance 212 of VPN instance 210, and the second pointer or link may be used to identify and update the host-to-router mapping in forwarding table instance 222 of VPN instance 220.

Figure 2B:
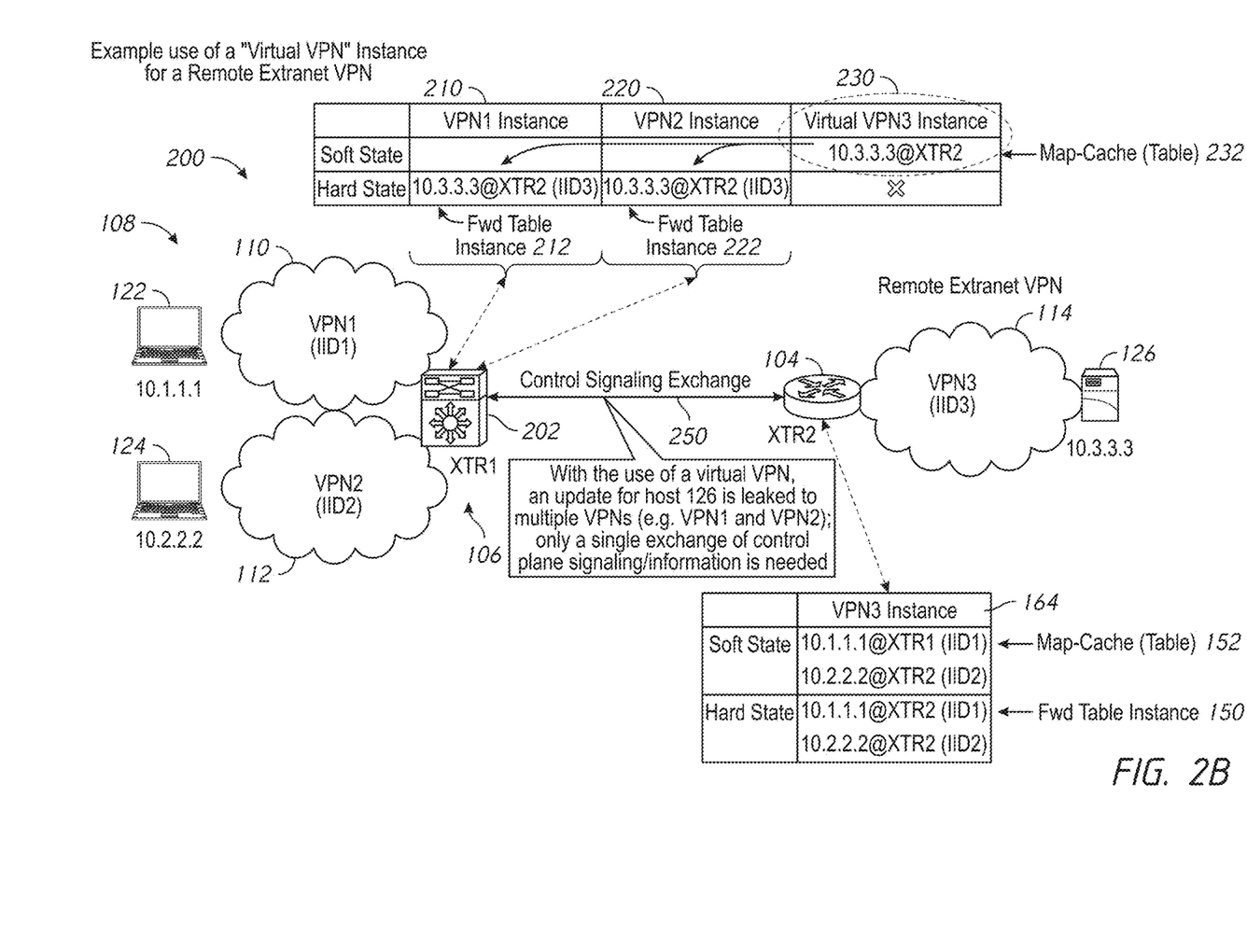
FIG. 2B is an illustrative representation of the network infrastructure arrangement of FIG. 2A according to some implementations of the present disclosure, further illustrating a single exchange of control signaling/information with the virtual VPN instance used for updates when the state of the host in the remote extranet VPN is updated.

To more fully illustrate such an update, host 126 of the remote extranet VPN ("VPN3") may be moved to a different location and/or become connected to a different router. In response, the host-to-router mapping for host 126 will change. That is, the router and/or RLOC in the host-to-router mapping will change. As a result, host-to-router mappings in other routers/VPNs (e.g. in router 202) may need to be updated. As described previously, virtual VPN instance 230 of the virtual VPN may serve as part of a control plane interface for control signaling associated with the remote extranet VPN. Thus, according to some implementations of the present disclosure, as indicated in FIG. 2B, an exchange (e.g. a single exchange) of control plane signaling 250 may take place between routers to update the host-to-router mapping for host 126 in map-cache 232 of the virtual VPN instance 230 of router 202. This (e.g. single) notification or update to the host-to-router mapping in map-cache 232 of the virtual VPN instance 230 may be used to update both (or all) of the affected host-to-router mappings in forwarding table instances 212 and 222 of the VPN instances 210 and 220, respectively. Here, the first pointer or link associated with virtual VPN instance 230 may be used to identify and update the host-to-router mapping in forwarding table instance 212 of VPN instance 210 ("VPN1"), and the second pointer or link associated with virtual VPN instance 230 may be used to identify and update the host-to-router mapping in forwarding table instance 222 of VPN instance 220 ("VPN2").

Note that, although a single virtual VPN instance of a single virtual VPN is shown and described in relation to FIGS. 2A-2B, a plurality of virtual VPN instances for a plurality of virtual VPNs associated with a plurality of remote extranet VPNs may be provided and used in the same or similar manner.

Figure 3:
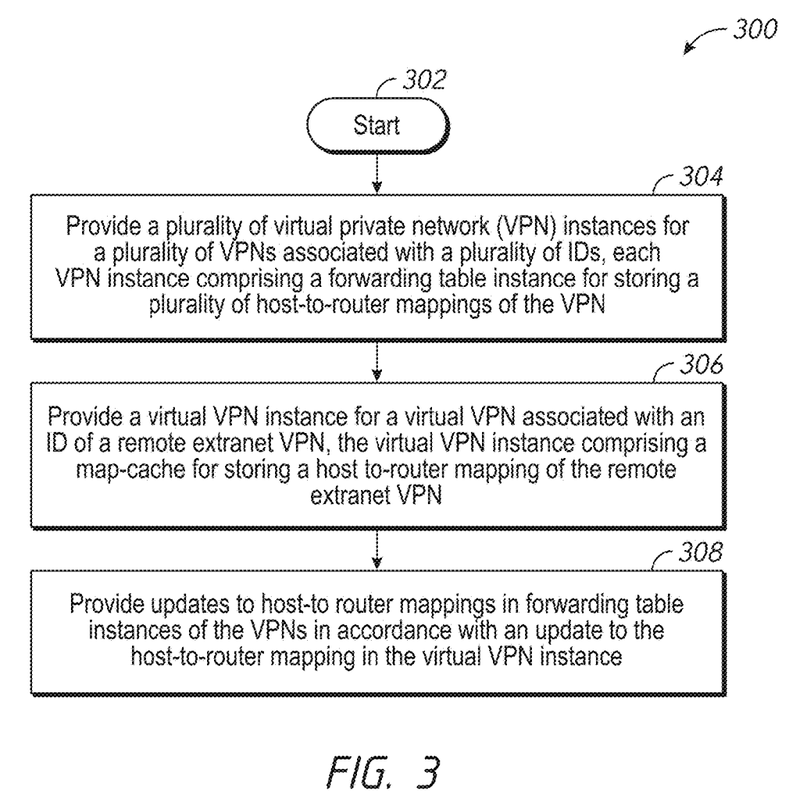
FIG. 3 is a flowchart for describing a router operating method for use in providing VPNs in communication networks, with use of one or more virtual VPN instances for hosts of remote extranet VPNs according to some implementations of the present disclosure.

FIG. 3 is a flowchart 300 for describing a router operating method for use in providing VPNs in communication networks according to some implementations of the present disclosure. The router operating method may involve the use of one or more virtual VPN instances in the router or routing device. The router may include one or more processors and one or more memory devices coupled to the one or more processors. The method may be embodied as a computer program product including a non-transitory computer readable medium and instructions stored in the computer readable medium where the instructions are executable on one or more processors of the router or routing device for performing the steps of the method.

Beginning at a start block 302 of FIG. 3, a router may provide a plurality of VPN instances (e.g. VRFs) for a plurality of VPNs associated with a plurality of IDs (step 304 of FIG. 3). Each VPN instance may comprise a forwarding table instance which stores a plurality of host-to-router mappings of the VPN. The router may further provide a virtual VPN instance for a virtual VPN associated with an ID of a remote extranet VPN (step 306 of FIG. 3). The virtual VPN instance may comprise a cache or a map-cache for storing a host-to-router mapping associated with the remote extranet VPN. The virtual VPN instance may have no (uniquely) corresponding forwarding table instance in the router, but serve as part of a control plane interface for control signaling associated with the remote extranet VPN. With use of the virtual VPN instance, the router may provide updates to host-to-router mappings in forwarding table instances of the VPNs in accordance with an update to the host-to-router mapping in the virtual VPN instance for the remote extranet host (step 308 of FIG. 3). For updates, one or more pointers or links may be provided in association with the host-to-router mapping in the map-cache of the virtual VPN instance. Note that step 306 of FIG. 3 (as well as its associated step 308) may be performed (e.g. repeated) for and in association with each one a plurality of additional remote extranet VPNs.

In some implementations, the technique of FIG. 3 may be implemented using LISP, where each host-to-router mapping may be between an End-point Identifier (EID) of a host and a Routing Locator (RLOC) of a router (e.g. with use of LISP), and the IDs used may be Instance-IDs ("IIDs").

Figure 4:
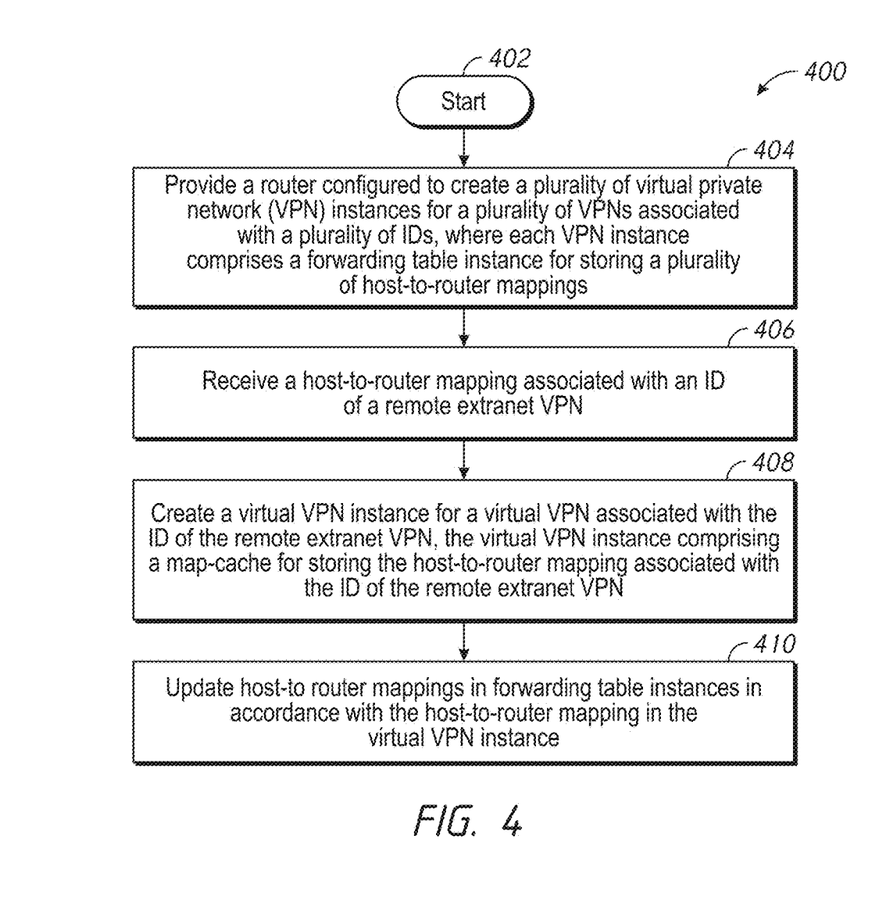
FIG. 4 is a flowchart for describing another router operating method for use in providing VPNs in communication networks, with use of one or more virtual VPN instances for hosts of remote extranet VPNs according to some implementations of the present disclosure.

FIG. 4 is a flowchart 400 for describing a router operator method for use in providing VPNs in communication networks according to some implementations of the present disclosure. The router operating method may be executed in a router or routing device. The router operating method may involve the use of one or more virtual VPN instances in the router or routing device. The router may include one or more processors and one or more memory devices coupled to the one or more processors. The method may be embodied as a computer program product including a non-transitory computer readable medium and instructions stored in the computer readable medium where the instructions are executable on one or more processors of the router or routing device for performing the steps of the method.

Beginning at a start block 402 of FIG. 4, the router may create and provide a plurality of VPN instances for a plurality of VPNs associated with a plurality of IDs (step 404 of FIG. 4). Each VPN instance may comprise a forwarding table instance for storing a plurality of host-to-router mappings of the VPN. The router may receive a host-to-router mapping associated with an ID of a remote extranet VPN (step 406 of FIG. 4). The ID may correspond to a VPN which is not instantiated in the router, and/or has no local member host/endpoints. In response, the router may create a virtual VPN instance for a virtual VPN associated with the ID of the remote extranet VPN (step 408 of FIG. 4). The virtual VPN instance for the virtual VPN may comprise a cache or a map-cache for storing the host-to-router mapping associated with the ID of the remote extranet VPN. The virtual VPN instance may have no (uniquely) corresponding forwarding table instance in the router, but may serve as part of a control plane interface for control signaling associated with the remote extranet VPN. With use of the virtual VPN instance, the router may update one or more of the host-to-router mappings in one or more of the forwarding table instances in accordance with the host-to-router mapping of the virtual VPN instance (step 410 of FIG. 4). For the updates, one or more pointers or links may be provided in association with the host-to-router mapping in the map-cache of the virtual VPN instance. Note that step 410 of FIG. 4 may be repeated for one or more updates to the host-to-router mapping associated with the remote extranet VPN. Note also that steps 406, 408, and 410 of FIG. 4 may be repeated for one or more additional host-to-router mappings associated with one or more additional remote extranet VPNs.

In some implementations, the technique of FIG. 4 may be implemented using LISP, where each host-to-router mapping may be between an End-point Identifier (EID) of a host and a Routing Locator (RLOC) of a router (e.g. with use of LISP), and the IDs used may be Instance-IDs ("IIDs").

Figure 5A:
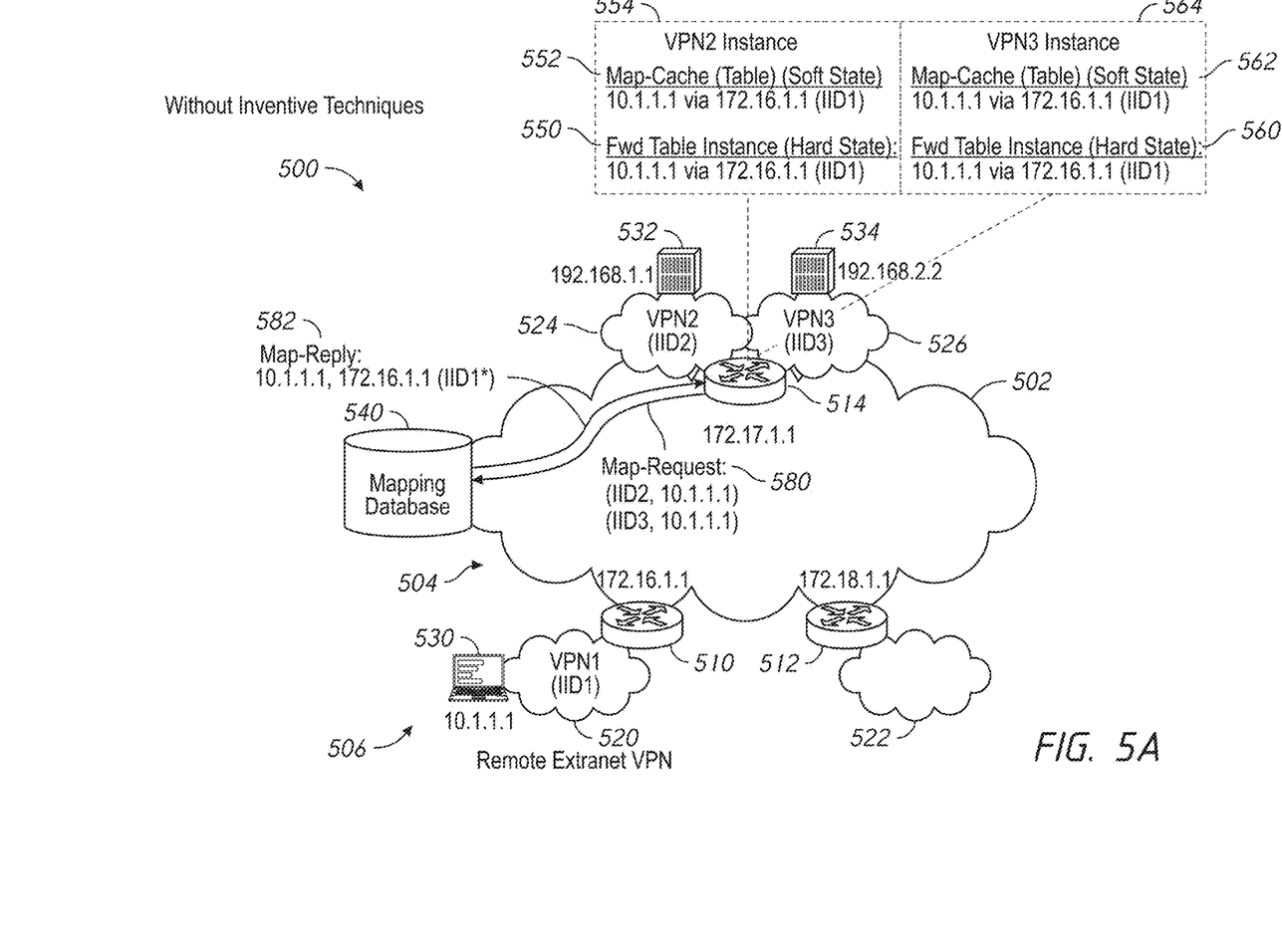
FIG. 5A is an illustrative representation of another network infrastructure arrangement for use in describing general VPN techniques which include the use of one or more remote extranet VPNs.

FIG. 5A is an illustrative representation of a network infrastructure arrangement 500 for further general VPN techniques, without use of virtual VPN instances of the present disclosure. Although LISP technology is used in the example, any suitable network overlay protocol configured to provide VPN networking may be utilized.

Network infrastructure arrangement 500 includes a plurality of routers 504 (e.g. routers 510, 512, and 514) and a plurality of hosts 506 (e.g. hosts 530, 532, and 534) in one or more communication networks 502. In FIG. 5A, router 510 may be associated with an RLOC of 172.16.1.1; router 512 may be associated with an RLOC of 172.18.1.1; and router 514 may be associated with an RLOC of 172.17.1.1. In addition, host 530 (e.g. a computer or other computing device) may be associated with an EID of 10.1.1.1; host 532 (e.g. a server) may be associated with an EID of 192.168.1.1; and host 534 (e.g. a server) may be associated with an EID of 192.168.2.2.

The plurality of routers 504 may be configured to provide VPNs for the plurality of hosts 506 with use of VRF technology. In the example of FIG. 5A, host 530 may be associated with a VPN 520 ("VPN1"), host 532 may be associated with a VPN 524 ("VPN2"), and host 534 may be associated with VPN 526 ("VPN3").

To provide VPNs in the network infrastructure arrangement 500, a router may be generally configured to create and maintain a plurality of VPN instances. Each VPN instance and/or VPN may be associated and/or identified with a unique ID, which may be an IID. A VPN instance comprises a forwarding table (or forwarding table instance) which includes a plurality of host-to-router mappings of the VPN. The host-to-router mappings in the forwarding table instance of the VPN are used for routing user data traffic between hosts of the VPN. Again, a forwarding table is or includes a relatively costly, high-speed memory, such as a TCAM. Each host-to-router mapping may be, for example, between an EID (e.g. an IP address) of a host and a RLOC (e.g. an IP address) of a router (e.g. an EID-to-RLOC mapping), in accordance with LISP.

More specifically in FIG. 5A, router 514 may be configured to create and maintain VPN instance 554 and VPN instance 564 to provide VPN 524 ("VPN2") and VPN 526 ("VPN3"), respectively. VPN instance 554 for VPN 524 ("VPN2") associated with IID2 may include a forwarding table instance 550 and an associated map-cache 552, and VPN instance 564 for VPN 526 ("VPN3") associated with IID3 may include a forwarding table instance 560 and an associated map-cache 562. From the perspective of router 514, VPN 520 ("VPN1") is a remote extranet VPN having no local member hosts/endpoints.

Again, a forwarding table instance of a VPN corresponds to storage of a "hard state" and its associated map-cache corresponds to storage of a "soft state." In router 514, a host-to-router mapping in VPN instance 554 for host 530 (e.g. 10.1.1.1 via 172.16.1.1 in the IID1 context) is stored in map-cache 552 as the "soft state," and this mapping be (subsequently) stored in forwarding table instance 550 as the "hard state." Also in router 514, the same host-to-router mapping in VPN instance 564 for host 530 (e.g. 10.1.1.1 via 172.16.1.1 in the IID1 context) is stored in map-cache 562 as the "soft state," and this mapping may be (subsequently) stored in forwarding table instance 560 as the "hard state."

When VPN 524 ("VPN2") needs to resolve the route or mapping associated with host 530, it may send to a mapping database 540 a map request 580 which includes the EID of host 530 (i.e. 10.1.1.1) in the context of IID2. In response, VPN 524 may receive from mapping database 540 a map reply 582 which includes the host-to-router mapping associated with host 530 (i.e. 10.1.1.1 via 172.16.1.1) and its associated IID (i.e. IID1). Map-cache 552 of VPN instance 554 of VPN 524 is updated with the received host-to-router mapping, and this map-cache 552 is used to update the host-to-router mapping in the forwarding table instance 550 of VPN instance 554 of VPN 524. Similarly, when VPN 526 ("VPN3") needs to resolve the route or mapping associated with host 530, it may send to mapping database 540 a map request 580 which includes the EID of host 530 (i.e. 10.1.1.1) in the context of IID3. In response, VPN 526 may receive from mapping database 540 a map reply 582 which includes the host-to-router mapping associated with host 530 (i.e. 10.1.1.1 via 172.16.1.1) and its associated IID (i.e. IID1). Map-cache 562 of VPN instance 564 of VPN 526 is updated with the received host-to-router mapping, and this map-cache 562 is used to update the host-to-router mapping in the forwarding table instance 560 of VPN instance 564 of VPN 526.

Figure 5B:
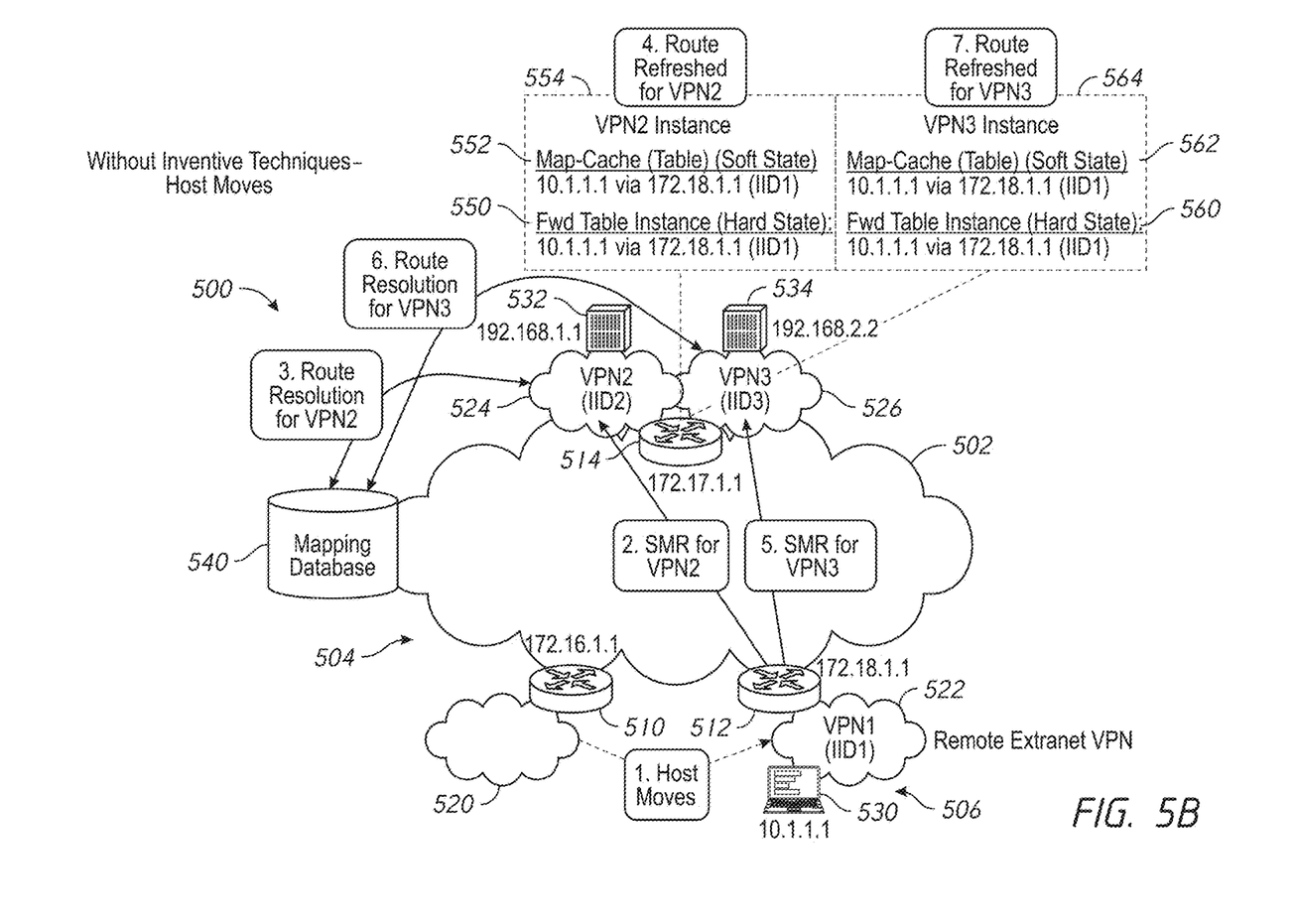
FIG. 5B is an illustrative representation of the network infrastructure arrangement of FIG. 5A, further illustrating multiple, replicated exchanges of control signaling/information used for updates when a host in the remote extranet VPN moves from one router to another router.

To more fully illustrate such an update with reference to FIG. 5B, sometime during network usage, host 530 may be moved to a different location and/or become connected to a different router (step 1 of FIG. 5B). For example, host 530 may be moved from router 510 to router 512 of a network 522. Accordingly, the host-to-router mapping for host 530 will change. In this example, the RLOC in the host-to-router mapping for host 530 will change from 172.16.1.1 of router 510 to 172.18.1.1 of router 512.

Subsequently, in response to detecting host 530, a message such as a solicit map request (SMR) may be generated for and received at VPN 524 ("VPN2") (step 2 of FIG. 5B). In response to receiving the SMR, VPN 524 may resolve the route, for example, by sending to mapping database 540 a map request and receiving a map reply in response (step 3 of FIG. 5B). The map reply includes the updated host-to-router mapping associated with host 530 (i.e. 10.1.1.1 via 172.18.1.1). Map-cache 552 of VPN instance 554 of VPN 524 is updated with the received host-to-router mapping, and this map-cache 552 is used to update the host-to-router mapping in the forwarding table instance 550 of VPN instance 554 of VPN 524 (step 4 of FIG. 5B).

Subsequently, an SMR may also be generated for and received at VPN 526 ("VPN3") (step 5 of FIG. 5B). In response to receiving the SMR, VPN 526 may resolve the route, for example, by sending to the mapping database 540 a map request and receiving a map reply in response (step 6 of FIG. 5B). The map reply includes the same updated host-to-router mapping associated with host 530 (i.e. 10.1.1.1 via 172.18.1.1). Map-cache 562 of VPN instance 564 of VPN 526 is updated with the received host-to-router mapping, and this map-cache 562 is used to update the host-to-router mapping in the forwarding table instance 560 of VPN instance 564 of VPN 526 (step 7 of FIG. 5B).

As is apparent, replicated control information is undesirably exchanged between routers when an update to a host-to-router mapping associated with a remote extranet VPN occurs (e.g. when a host moves to a new location). Again, when the number of remote extranet VPNs becomes large, the number of exchanges of control plane signaling may become undesirably large or even prohibitive.

Figure 6A:
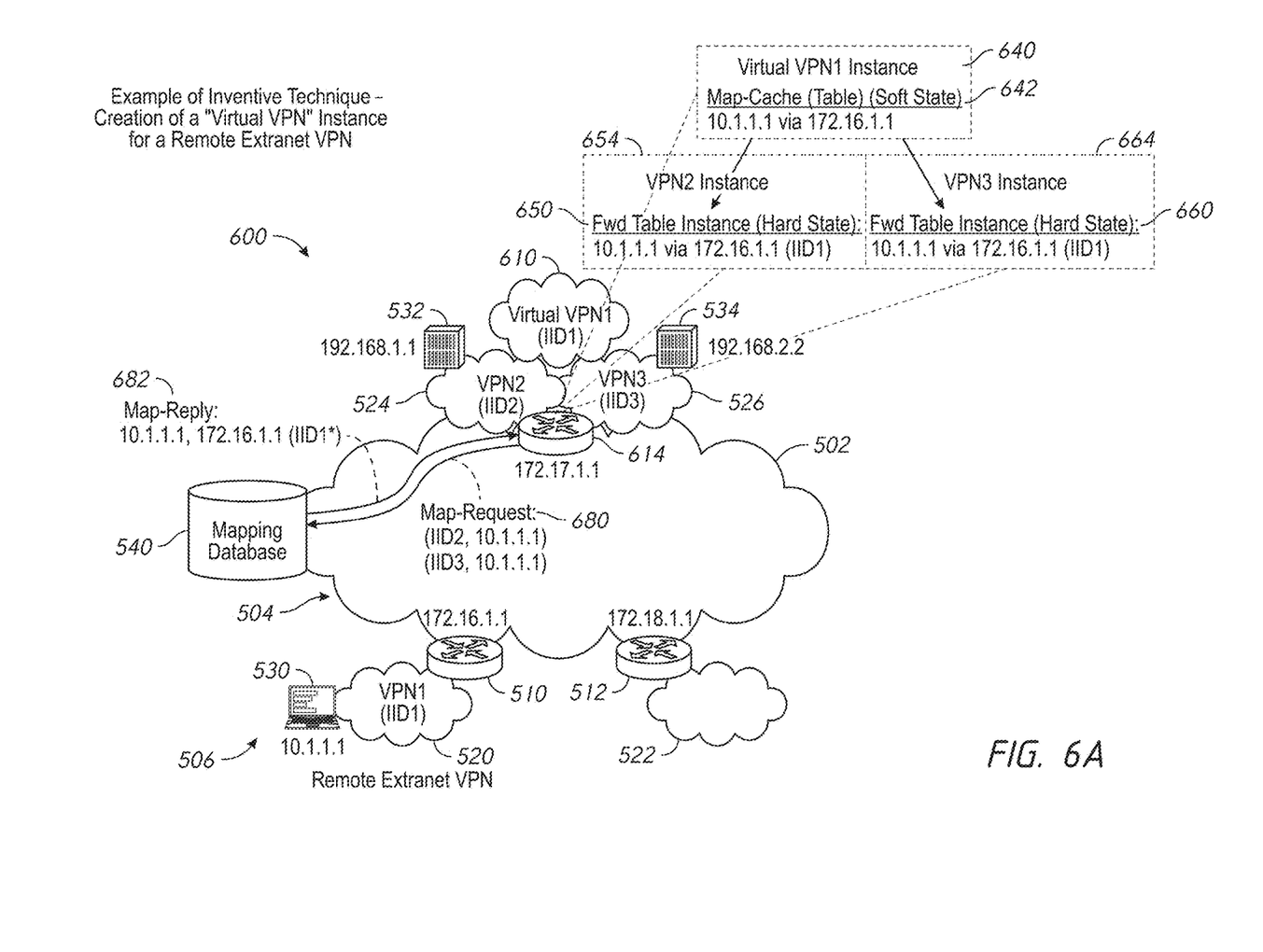
FIG. 6A is an illustrative representation of yet another network infrastructure arrangement for use in describing VPN techniques according to some implementations of the present disclosure, where a "virtual VPN instance" associated with a remote extranet VPN is provided.

FIG. 6A is an illustrative representation of a network infrastructure arrangement 600 for use in describing virtual private networking techniques according to some implementations of the present disclosure. Network infrastructure arrangement 600 includes the same or similar network elements and functionality as described above in relation to FIGS. 5A-5B, except that router 514 (now a "router 614" of FIGS. 6A-6B) is configured to employ VPN instances as well as "virtual VPN instances" for "virtual VPNs" according to some implementations of the present disclosure. Again, although LISP technology is used in the example implementations described herein, any suitable network overlay protocol configured to provide VPN networking may be utilized.

Notably, router 614 may be configured to create and maintain a "virtual VPN instance" 640 for a virtual VPN 610 for host 530 of VPN 520 ("VPN1") which is a remote extranet VPN. Virtual map instance 640 may comprise a cache or map-cache 642 for storing a host-to-router mapping associated with the remote extranet VPN. Virtual VPN instance 640 for the virtual VPN 610 is without a (uniquely) corresponding forwarding table instance in router 614. Virtual VPN instance 640 does not require the use of the relatively costly, high-speed memory in router 614. As is apparent, a VPN instance is not instantiated in router 614 for the remote extranet VPN, but rather virtual VPN instance 640 for virtual VPN 610 is created and maintained. Relatedly, note that, with use of virtual VPN instance 640, a specific corresponding map-cache or soft state need not be used or maintained in relation to either one of VPN instances 654 and 664 as shown (e.g. compare with FIGS. 5A-5B).

Router 614 may create virtual VPN instance 640 in response to receiving a message, such as message which includes a host-to-router mapping for a host of a remote extranet VPN. More specifically, virtual VPN instance 640 may be created when the received host-to-router mapping is associated with an IID of a remote extranet VPN which is not instantiated in router 614 and/or has no local member host/endpoints.

To illustrate such creation, VPN 524 ("VPN2") may send to mapping database 540 a map request 680 associated with host 530 identified by 10.1.1.1 and, in response, receive from mapping database 540 a map reply 682 which includes the host-to-router mapping for host 530 (i.e. 10.1.1.1 via 172.16.1.1) and its associated IID (i.e. IID1). IID1 corresponds to a remote extranet VPN; a VPN for IID1 is not instantiated in router 614, and no local member host/endpoints for IID1 exist. In response, VPN 524 may create virtual VPN instance 640 for the remote extranet VPN. Alternatively, and similarly, VPN 526 ("VPN3") may send to mapping database 540 a map request 680 associated with host 530 identified by 10.1.1.1, and receive in response a map reply 682 which includes the host-to-router mapping for host 530 (i.e. 10.1.1.1 via 172.16.1.1) and its associated IID (i.e. IID1). IID1 corresponds to a remote extranet VPN; a VPN for IID1 is not instantiated in router 614, and no local member host/endpoints for IID1 exist. In response, VPN 526 may create virtual VPN instance 640 for the remote extranet VPN.

Again, virtual VPN instance 640 of the virtual VPN may serve as part of a control plane interface for control signaling associated with the remote extranet VPN. For example, virtual VPN instance 640 may be used in an exchange of control signaling/information for an update to the host-to-router mapping of host 530 of the remote extranet VPN (i.e. VPN 520 or "VPN1"). For providing such an update(s), one or more pointers or links may be provided in association with the host-to-router mapping in map-cache 642 of virtual VPN instance 640. For example, a first pointer or link may be provided for pointing or linking to forwarding table instance 650 of VPN instance 654, and a second pointer or link may be provided for pointing or linking to forwarding table instance 660 of VPN instance 664. In response to an update to the host-to-router mapping in map-cache 642 of virtual VPN instance 640, the first pointer or link may be used to identify and update the host-to-router mapping in forwarding table instance 650 of VPN instance 654, and the second pointer or link may be used to identify and update the host-to-router mapping in forwarding table instance 660 of VPN instance 664.

Figure 6B:
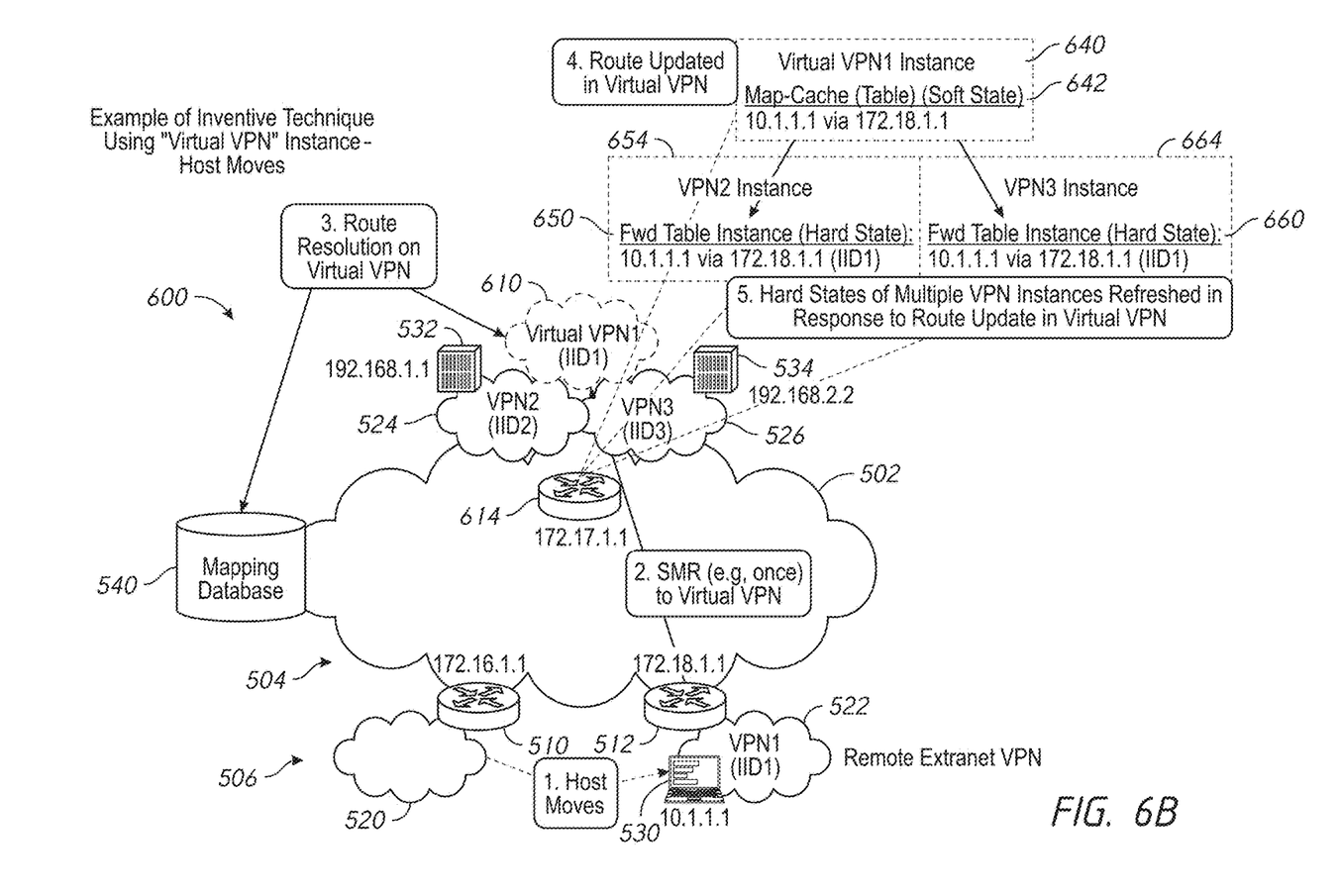
FIG. 6B is an illustrative representation of the network infrastructure arrangement of FIG. 6A according to some implementations of the present disclosure, further illustrating a single exchange of control signaling/information with the virtual VPN instance which may be used for updates when a host in the remote extranet VPN moves from one router to another router.

To more fully illustrate such an update with reference to FIG. 6B, sometime during network usage, host 530 may be moved to a different location and/or become connected to a different router (step 1 of FIG. 6B). For example, host 530 may be moved from router 510 to router 512 of network 522. Accordingly, the host-to-router mapping for host 530 will change. In this example, the RLOC in the host-to-router mapping for host 530 will change from 172.16.1.1 of router 510 to 172.18.1.1 of router 512. In response to detecting the new host 530, a message such as an SMR may be generated for and received at the virtual VPN 610 ("virtual VPN1") (step 2 of FIG. 6B). In response to receiving the SMR, the virtual VPN 610 may resolve the route, for example, by sending to the mapping database 540 a map request and receiving a map reply in response (step 3 of FIG. 6B). The map reply may include the updated host-to-router mapping associated with host 530 (i.e. 10.1.1.1 via 172.18.1.1). Map-cache 642 of VPN instance 640 of virtual VPN 610 may then be updated according to the received host-to-router mapping (step 4 of FIG. 6B). The updated host-to-router mapping in the map-cache 642 of VPN instance 640 may then be used to update the host-to-router mapping in forwarding table instance 650 of VPN instance 654 for VPN 524 ("VPN2"), as well as to update the host-to-router mapping in forwarding table instance 660 of VPN instance 664 for VPN 526 ("VPN3") (step 5 of FIG. 6B).

As is apparent, with use of a virtual VPN, a simple exchange (e.g. a single exchange) of control signaling may be used as a trigger to update each and every affected VPN instance in the router. Advantages associated with a distributed hard state for extranets may be maintained without "paying the price" of an increased control signaling load. No control signaling across VPN boundaries in the router is necessary. Further, memory space in the costly, high-speed memory of the router may be conserved.

Thus, router operating methods and apparatus using "virtual VPN instances" for hosts of remote extranet VPNs have been described herein. In one illustrative example, a router may be configured to provide a plurality of VPN instances for a plurality of VPNs associated with a plurality of IDs. Each VPN instance may comprise a forwarding table instance for storing a plurality of host-to-router mappings for the VPN. The router may be further configured to provide a virtual VPN instance for a virtual VPN associated with an ID of a remote extranet VPN. The virtual VPN instance may comprise a cache or map-cache for storing a host-to-router mapping for the remote extranet VPN. The virtual VPN instance in the map-cache may have no corresponding forwarding table instance in the router, but simply serve as part of a control plane interface for control signaling associated with the remote extranet VPN (e.g. no user plane traffic associated with the remote extranet VPN is or need be facilitated by the router). Accordingly, the router may provide multiple updates to host-to-router mappings in forwarding table instances of the VPNs in accordance with a (e.g. single) notification of a change in the host-to-router mapping in the virtual VPN instance. Such a virtual VPN instance comprising a cache or map-cache may be provided in the router for and in association with each one of a plurality of different remote extranet VPNs.

One or more pointers or links may be provided in association with the virtual VPN instance which stores the host-to-router mapping of the remote extranet VPN. A pointer or link may be for pointing to a forwarding table instance of a VPN which stores a host-to-router mapping of the VPN. An update to the forwarding table instance of the VPN may be provided based on the pointer or link.

In another illustrative example, a router may comprise one or more processors and one or more memory devices coupled to the one or more processors. The router may be configured to generate and maintain a plurality of VPN instances for a plurality of VPNs associated with a plurality of IDs, where each VPN instance comprise a forwarding table instance for storing a plurality of host-to-router mappings of the VPN; a virtual VPN instance for a virtual VPN associated with an ID of a remote extranet VPN, where the virtual VPN instance comprises a cache or map-cache for storing a host-to-router mapping of the remote extranet VPN; and one or more pointers or links associated with the virtual VPN instance, for updating one or more host-to-router mappings in one or more of the forwarding tables of the VPN instances. The virtual VPN instance for the virtual VPN may be without a corresponding forwarding table instance in the router, and serve as part of a control plane interface for control signaling associated with the remote extranet VPN.

In yet another illustrative example, a router may be configured to provide a plurality of VPN instances for a plurality of VPNs associated with a plurality of IDs. Each VPN instance may comprise a forwarding table instance for storing a plurality of host-to-router mappings. The router may receive a host-to-router mapping associated with an ID of a remote extranet VPN. In response to receiving the host-to-router mapping, the router may create a virtual VPN instance for a virtual VPN associated with the ID of the remote extranet VPN. The virtual VPN instance may comprise a cache or map-cache for storing the host-to-router mapping associated with the ID of the remote extranet VPN. Then, the router may update one or more of the host-to-router mappings in one or more of the forwarding table instances of the VPNs in accordance with the host-to-router mapping in the virtual VPN instance.

Note that the components and techniques shown and described in relation to the separate figures may indeed be provided as separate components and techniques, and alternatively one or more (or all of) the components and techniques shown and described in relation to the separate figures are provided together for operation in a cooperative manner.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are used to distinguish one element from another. For example, a first VPN instance could be termed a second VPN instance, and similarly, a second VPN instance could be termed a first VPN instance, without changing the meaning of the description, so long as all occurrences of the "first VPN instance" are renamed consistently and all occurrences of the "second VPN instance" are renamed consistently. The first VPN instance and the second VPN instance are both VPN instances, but they are not the same VPN instance.

Further regarding terminology, note that, as the devices indicated in the "host-to-router" mappings may be any suitable devices, the mapping terminology may be more broadly named and/or interpreted, for example, as "node-to-router" mappings, "node-to-node" mappings, "address-to-address" mappings, "identifier-to-identifier" mappings, etc. Further, in relation to any of the illustrative examples described herein, it may be alternatively stated (e.g. in lieu of use of the "virtual VPN" terminology) that what is provided is a cache or map-cache for storing a host-to-router mapping for a remote extranet VPN. Here, the map-cache may have no (uniquely) corresponding forwarding table instance in the router, but may serve simply as part of a control plane interface for control signaling associated with the remote extranet VPN (e.g. no user plane traffic for hosts of the remote extranet VPN is facilitated by the router).

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a router,
        providing a plurality of virtual private network (VPN) instances for a plurality of VPNs associated with a plurality of IDs, each VPN instance comprising a forwarding table instance for storing a plurality of host-to-router mappings of the VPN; and
        providing a virtual VPN instance for a virtual VPN associated with an ID of a remote extranet VPN, the virtual VPN instance comprising a cache for storing a host-to-router mapping of the remote extranet VPN.

2. The method of claim 1, further comprising:
    providing updates to one or more of the host-to-router mappings in one or more of the forwarding table instances of the VPNs in accordance with an update to the host-to-router mapping in the virtual VPN instance.

3. The method of claim 1, wherein the virtual VPN instance for the virtual VPN is without a corresponding forwarding table instance for user plane traffic associated with the remote extranet VPN.

4. The method of claim 3, wherein the virtual VPN instance for the virtual VPN serves as part of a control plane interface for control signaling associated with the remote extranet VPN.

5. The method of claim 1, wherein each host-to-router mapping is between an End-point Identifier (EID) of a host and a Routing Locator (RLOC) of a router, and wherein the IDs comprise Instance-IDs (IIDs), in accordance with a Locator/ID Separation Protocol (LISP).

6. The method of claim 1, wherein the router is configured to operate in accordance with a network overlay protocol to provide the plurality of VPNs, the network overlay protocol comprising one of Virtual Extensible LAN (VXLAN), Enhanced VLAN (EVLAN), or Identifier Locator Addressing (ILA).

7. The method of claim 2, further comprising:
    providing one or more pointers or links in association with the virtual VPN instance which stores the host-to-router mapping of the remote extranet VPN; and
    wherein providing the updates further comprises providing an update based on the pointer or link.

8. The method of claim 1, further comprising:
    sending, to a mapping database, a map request which includes an identifier of a host; and
    receiving, from the mapping database, a map reply which includes the host-to-router mapping associated with the remote extranet VPN.

9. The method of claim 2, further comprising:
    sending, from the virtual VPN to a mapping database, a map request which includes an identifier of a host;
    receiving, at the virtual VPN from the mapping database, a map reply which includes an updated host-to-router mapping associated with the remote extranet VPN; and
    updating the host-to-router mapping in the virtual VPN instance of the virtual VPN in accordance with the updated host-to-router mapping associated with the remote extranet VPN, thereby causing one or more of the host-to-router mappings of one or more of the forwarding table instances of the VPNs to be updated.

10. The method of claim 1, further comprising:
    receiving a host-to-router mapping associated with an ID of a remote extranet VPN having no local member endpoints; and
    generating, in the cache, the virtual VPN instance for the virtual VPN associated with the ID of the remote extranet VPN, the virtual VPN instance for storing the host-to-router mapping associated with the ID of the remote extranet VPN.

11. A router comprising:
    a plurality of virtual private network (VPN) instances for a plurality of VPNs associated with a plurality of IDs, each VPN instance comprising a forwarding table instance for storing a plurality of host-to-router mappings of the VPN;
    a virtual VPN instance for a virtual VPN associated with an ID of a remote extranet VPN, the virtual VPN instance comprising a cache for storing a host-to-router mapping of the remote extranet VPN; and
    one or more pointers or links associated with the virtual VPN instance, for updating one or more host-to-router mappings in one or more of the forwarding tables of the VPN instances.

12. The router of claim 11, wherein the virtual VPN instance for the virtual VPN is without a corresponding forwarding table instance in the router, and serves as part of a control plane interface for control signaling associated with the remote extranet VPN.

13. A method comprising:
    at a router configured to provide a plurality of virtual private network (VPN) instances for a plurality of VPNs associated with a plurality of IDs, where each VPN instance comprises a forwarding table instance for storing a plurality of host-to-router mappings:
        receiving a host-to-router mapping associated with an ID of a remote extranet VPN;
        creating a virtual VPN instance for a virtual VPN associated with the ID of the remote extranet VPN, the virtual VPN instance comprising a cache for storing the host-to-router mapping associated with the ID of the remote extranet VPN; and
        updating one or more of the host-to router mappings in one or more of the forwarding table instances of the VPNs in accordance with the host-to-router mapping in the virtual VPN instance.

14. The method of claim 13, wherein updating comprises updating routing locators in the host-to-router mappings in the forwarding table instances of the VPNs.

15. The method of claim 13, wherein each of one or more of the host-to-router mappings is between an End-point Identifier (EID) of a host and a Routing Locator (RLOC) of a router and wherein the IDs comprise Instance-IDs (IIDs).

16. The method of claim 13, further comprising:
sending to a mapping database a map request which includes an identifier of a host; and
wherein receiving comprises receiving from the mapping database a map reply which includes the host-to-router mapping associated with the ID of the remote extranet VPN having no local member endpoints.

17. The method of claim 13, further comprising:
sending, from the virtual VPN to a mapping database, a map request which includes an identifier of a host;
receiving, at the virtual VPN from the mapping database, a map reply which includes an updated host-to-router mapping associated with the host; and
updating the host-to-router mapping in the virtual VPN instance according to the updated host-to-router mapping, thereby causing one or more host-to-router mappings of one or more forwarding table instances of the VPNs to be updated.

18. The method of claim 13, wherein the virtual VPN instance serves as part of a control plane interface for control signaling associated with the remote extranet VPN.

19. The method of claim 13, wherein the virtual VPN instance for the virtual VPN is without a corresponding forwarding table instance for forwarding user plane traffic associated with the remote extranet VPN.

20. The method of claim 13, further comprising:
providing one or more pointers or links in association with the virtual VPN instance which stores the host-to-router mapping of the remote extranet VPN; and
wherein the updating further comprises updating the host-to-router mapping in the forwarding table instance of the VPN identified based on the pointer or link.

* * * * *